(12) United States Patent
Kolze et al.

(10) Patent No.: US 7,308,050 B2
(45) Date of Patent: Dec. 11, 2007

(54) DETECTION AND MITIGATION OF TEMPORARY IMPAIRMENTS IN A COMMUNICATIONS CHANNEL

(75) Inventors: Thomas Kolze, Phoenix, AZ (US); Bruce Currivan, Irvine, CA (US); Jonathan Min, Buena Park, CA (US)

(73) Assignee: Broadcom Corporation, Irvine, CA (US)

( * ) Notice: Subject to any disclaimer, the term of this patent is extended or adjusted under 35 U.S.C. 154(b) by 1044 days.

(21) Appl. No.: 10/000,415

(22) Filed: Nov. 2, 2001

(65) Prior Publication Data
US 2002/0186793 A1 Dec. 12, 2002

Related U.S. Application Data

(60) Provisional application No. 60/296,884, filed on Jun. 8, 2001.

(51) Int. Cl.
*H04L 27/01* (2006.01)
(52) U.S. Cl. ....................................... 375/340
(58) Field of Classification Search ................ 375/224, 375/226, 227, 228, 316, 340, 341, 377, 346; 455/501, 500, 39, 67.13, 67.11, 63.1, 296, 455/130, 334; 714/699, 704
See application file for complete search history.

(56) References Cited

U.S. PATENT DOCUMENTS

| | | | | |
|---|---|---|---|---|
| 5,406,593 | A | * | 4/1995 | Chennakeshu et al. ..... 375/376 |
| 5,604,730 | A | * | 2/1997 | Tiedemann, Jr. ............. 370/252 |
| 5,671,253 | A | * | 9/1997 | Stewart ........................ 375/316 |
| 5,751,725 | A | * | 5/1998 | Chen .......................... 714/708 |
| 5,910,959 | A | * | 6/1999 | Olafsson et al. ............. 714/752 |
| 5,942,003 | A | | 8/1999 | Ivry et al. |
| 6,215,827 | B1 | * | 4/2001 | Balachandran et al. ..... 375/262 |
| 6,438,180 | B1 | * | 8/2002 | Kavcic et al. .............. 375/341 |
| 6,691,263 | B2 | * | 2/2004 | Vasic et al. .................. 714/709 |

(Continued)

FOREIGN PATENT DOCUMENTS

EP 0689312 A 12/1995

(Continued)

OTHER PUBLICATIONS

Merriam-Webster's Collegiate Dictionary.*

(Continued)

*Primary Examiner*—Pankaj Kumar
(74) *Attorney, Agent, or Firm*—McAndrews, Held & Malloy, Ltd.

(57) ABSTRACT

Systems and methods are disclosed for detecting temporary high level impairments, such as noise or interference, for example, in a communications channel, and subsequently, mitigating the deleterious effects of the dynamic impairments. In one embodiment, the method not only performs dynamic characterization of channel fidelity against impairments, but also uses this dynamic characterization of the channel fidelity to adapt the receiver processing and to affect an improvement in the performance of the receiver. For example, in this embodiment, the method increases the accuracy of the estimation of the transmitted information, or similarly, increases the probability of making the correct estimates of the transmitted information, even in the presence of temporary severe levels of impairment. The channel fidelity history may also be stored and catalogued for use in, for example, future optimization of the transmit waveform.

28 Claims, 13 Drawing Sheets

U.S. PATENT DOCUMENTS 6,760,385 B1 * 7/2004 Goodson .................... 375/265

FOREIGN PATENT DOCUMENTS

| EP | 0991239 A | 4/2000 |
|---|---|---|
| WO | WO-97/50198 A | 12/1997 |
| WO | WO-01/26318 A | 4/2001 |

OTHER PUBLICATIONS

Marco Lops et al., *Narrow-Band-Interference Suppression in Multiuser CDMA Systems*, Sep. 1998, pp. 1163-1175.

Jeffrey A. Young et al., *Analysis of DFT-Based Frequency Excision Algorithms for Direct-Sequence Spread-Spectrum Communications*, Aug. 1998, pp. 1076-1087.

Weon-Cheol L et al, "Performance Analysis of Viterbi Decoder Using Channel State Information in COFDM System", IEEE Transactions on Broadcasting, IEEE Inc. New York, USA, vol. 44 No. 4, Dec. 1998, pp. 488-496, XP002342542.

Mignone V et al, "CD3-ODFM: A New Channel Estimation Method to Improve the Spectrum Efficiency in Digital Terrestrial Television Systems", International Broadcasting Convention, No. 413, Sep. 14, 1995, pp. 122-128, XP000617513.

Jacobsmeyer J M, "An Adaptive Modulation Scheme for Bandwidth-Limited Meteor-Burst Channels", 1988 IEEE Military Communications Conference, New York, USA, Oct. 23, 1988, pp. 933-037, XP010072049.

* cited by examiner

DETECTION AND MITIGATION OF TEMPORARY IMPAIRMENTS IN A COMMUNICATIONS CHANNEL

CROSS-REFERENCE TO RELATED APPLICATIONS

This application makes reference to, and claims priority to and the benefit of, U.S. provisional application Ser. No. 60/296,884 filed Jun. 8, 2001, which application is hereby incorporated herein by reference in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

The present invention applies to communications systems, all of which are inherently limited in their capacity (or rate) of information transfer by channel impairments. One example of an impairment is often referred to by the generic term "noise." Noise sometimes emanates, for example, from within electrical components themselves, such as amplifiers and even passive resistors. Another example of an impairment is referred to as "interference," which is usually taken to be some unwanted manmade emission perhaps for another communications system such as radio, or perhaps from switching circuits in a home or automobile. "Distortion" is a further example of an impairment, and includes linear distortion in the channel, such as pass-band ripple or non-flat group delay, and nonlinear distortion, such as compression in an overdriven amplifier. Of course, there are many other types of impairments that may adversely affect communications in a channel.

Often in communications channels, the impairments may by dynamic in nature. In many cases, the impairment level may be at one level of severity most of the time, and the communications system may be designed or optimized (in some fashion) to operate at that level of impairment. Occasionally, however, one or more of the impairments may rise to so severe an amount as to preclude the operation of the communications system optimized for the more ordinary level of impairments.

In prior art, in some applications where a large interferer or burst of noise occasionally impinges upon the receiver, the received signal is simply blanked during increased power to mitigate large out-of-the ordinary bursts of received power. Often, analog processing means are used, almost at, if not right at, the receiver input. Sometimes this is done especially to protect sensitive receiver front-ends from damage. While this technique may provide some benefit in circumstances where the noise or interference power dwarfs the signal-of-interest power, it does not protect against the many other impairments which have power more on the order of the signal-of-interest power (or even much less). Also, by itself, this blanking does not provide the receiver with a means to improve its overall performance in the presence of the lost information, i.e., the information content concurrent with the large noise burst.

Other prior art that may have been applied to this problem, even unknowingly, is the use of forward error correction (FEC) techniques that incorporate soft-decision decoding, such as is common with convolutional error correction codes and the Viterbi decoding algorithm. In this prior art, as the error power in the received signal is increased, this increase is passed directly into the decision process. Such encoding and decoding techniques have been in common practice for years, and are widely applied without thought to temporary fidelity changes in the channel. Fortunately, in the event of a change in the channel fidelity, the soft-decision decoding will automatically take into consideration the larger error power in making signal decisions. However, unfortunately, often with a change in channel conditions, there is a duration of multiple symbol intervals (in a digital communications system example) where the degradation persists, and during this time some symbols may be erred so severely that they actually appear close to another possible (but wrong) symbol. In this event, which becomes much more likely as the constellation density (of a QAM constellation, for example) is increased for high rate communications, the soft-decision decoder actually "thinks" it has received a low error power, and may rate the wrong signal with a high confidence.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in a method of impairment mitigation for use in a communications system. In one embodiment, the method comprises generating one or more error power estimates of a signal. The error power estimate(s) are then used to determine a channel fidelity metric, which in turn is used to decode the signal. The signal may comprise, for example, one or more digital samples in an analog communications example, or one or more symbols in a digital communications example.

In one embodiment, the channel fidelity metric is stored for use in future communication. For example, the stored fidelity metric may be used to determine a transmit waveform and/or to select a receiver algorithm.

In one embodiment involving digital communications, the error power estimate(s) is/are generated by determining a constellation point(s) closest to the symbol(s), and squaring the distance between the symbol(s) and the constellation point(s).

In one embodiment, determining a channel fidelity metric comprises comparing the error power estimate(s) to a predetermined threshold(s), and generating a first indication (e.g., indicating a channel degraded condition) if the error power estimate(s) is/are above the predetermined threshold (s), and a second indication (e.g., indicating a channel OK condition) if the error power estimate(s) is/are not above the predetermined threshold(s). A select symbol, i.e., one under consideration, is kept if the error power estimate(s) is/are below the predetermined threshold(s), and is erased if the error power estimate(s) is/are above the threshold(s). The signal is then decoded with the erasures.

In another embodiment, a branch metric is generated, and then modified based on the channel fidelity metric. For example, the branch metric is set to a low probability if the fidelity metric indicates a degraded channel. The signal is then decoded using the modified branch metric in a Viterbi decoder, for example.

These and other advantages and novel features of the present invention, as well as details of an illustrated embodiment thereof, will be more fully understood from the following description and drawings.

DETAILED DESCRIPTION OF THE INVENTION

The following description is made with reference to the appended figures.

Figure 1:
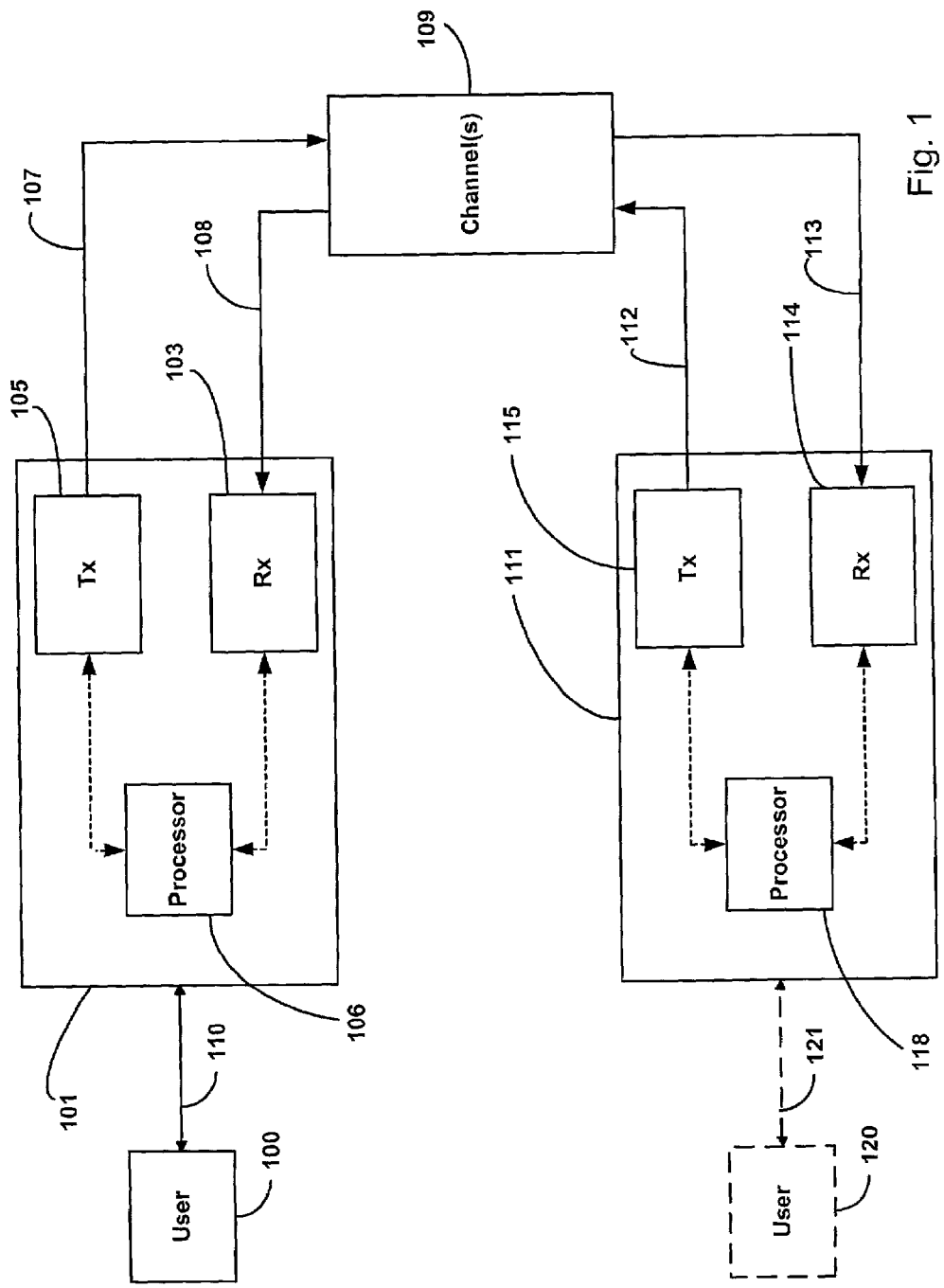
FIG. 1 illustrates a block diagram of a generic communication system that may be employed in connection with one embodiment of the present invention.

FIG. 1 illustrates a block diagram of a generic communication system that may be employed in connection with one embodiment of the present invention. The system comprises a first communication node 101, a second communication node 111, and at least one channel 109 that communicatively couples the nodes 101 and 111. The communication nodes may be, for example, cable modems, DSL modems or any other type of transceiver device that transmits or receives data over one or more channels.

The first communication node 101 comprises a transmitter 105, a receiver 103 and a processor 106. The processor 106 may comprise, for example, a microprocessor. The first communication node 101 is communicatively coupled to a user 100 (e.g., a computer) via communication link 110, and to the channel 109 via communication links 107 and 108. Of course, communication links 107 and 108 may be combined into a single communication link.

Similarly, the second communication node 111 comprises a transmitter 115, a receiver 114 and a processor 118. The processor 118, like processor 106, may comprise, for example, a microprocessor. The second communication node 111 likewise is communicatively coupled to the at least one channel 109 via communication links 112 and 113. Again, like communication links 107 and 108, the communication links 112 and 113 may also be combined into a single communication link. The communication node 111 may also be communicatively coupled to a user 120 (again a computer, for example) via communication link 121. In the case when communication node 111 is a headend, for example, user 120 may not be present.

During operation of one embodiment of FIG. 1, the user 100 can communicate information to the user 120 using the first communication node 101, the at least one channel 109 and the second communication node 111. Specifically, the user 100 communicates the information to the first communication node 101 via communication link 110. The information is transformed in the transmitter 105 to match the restrictions imposed by the at least one channel 109. The transmitter 105 then communicates the information to the at least one channel 109 via communication link 107.

The receiver 114 of the second communication node 111 next receives, via communication link 113, the information from the at least one channel 109 and transforms it into a form usable by the user 120. Finally, the information is communicated from the second communication node 111 to the user 120 via the communication link 121.

Communication of information from user 120 to user 100 may also be achieved in a similar manner. In either case, the information transmitted/received may also be processed using the processors 106/118.

Figure 2:
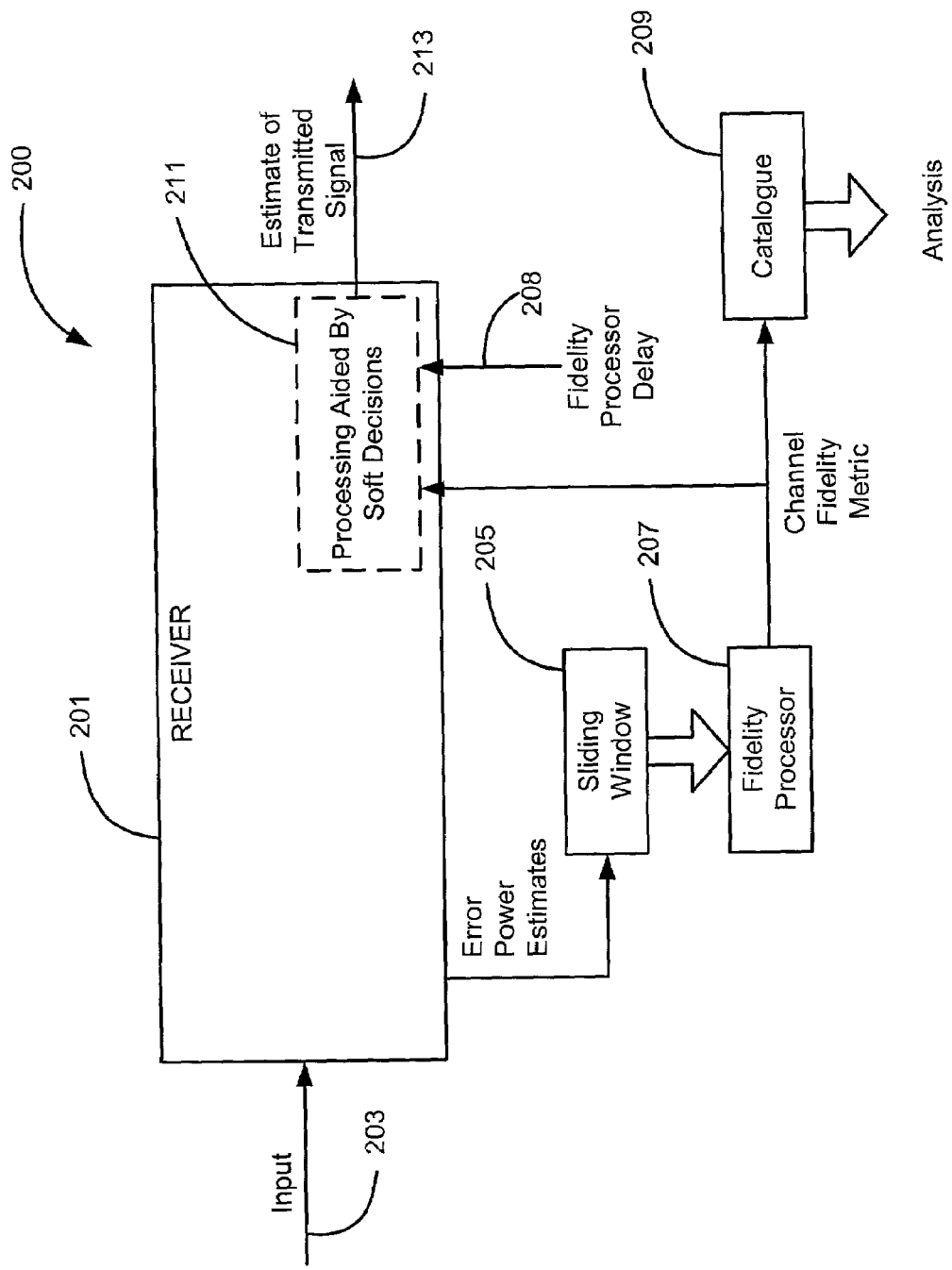
FIG. 2 is a block diagram of an impairment mitigation system in accordance with one embodiment of the present invention.

FIG. 2 is a block diagram of an impairment mitigation system 200 in accordance with one embodiment of the present invention. The system 200 may be contained, for example, in one or both of the communication nodes of FIG. 1. Error power estimates on a sample by sample basis may be generated for analog modulations. A receiver 201 receives at input 203 an input of either noise (when no signal is present) or a signal with time varying distortion and/or noise, for example. The receiver 201 uses the input to generate error power estimates, and may do so either on a bit by bit basis or using a sequence of bits (or on a symbol by symbol basis or using a sequence of symbols, in a digital communications example). A sliding window 205 receives the error power estimates. The error power estimates are processed in a fidelity processor 207 and a metric for channel fidelity is continuously generated as the window (i.e., time) progresses. The behavior of the metric versus time may be catalogued (see catalogue 209) and/or analyzed and used to optimize the transmission waveform, and it may be used to enhance receiver performance in real-time, or near-real time, or even in a post-reception, post-processing mode.

A delay 208 between the input error power estimates of the window 205 and the corresponding channel fidelity metric is known for a given fidelity processor, and is provided back (made known) to a remainder of the system. The system uses the evolving fidelity metric in its processing, which may be aided by soft decisions (reference numeral 211). Soft decisions comprise, for example, erasure decoding or standard soft decision decoding, such as Viterbi decoding. In any case, the receiver outputs an estimate of the transmitted signal (reference numeral 213).

While FIG. 2 illustrates a system having some components and functionality located outside of the receiver, it should be understood that such system may have additional components or functionality located within the receiver, or may in fact be entirely contained within the receiver. In addition, it should also be understood that the estimation of the error power and the processing shown as being performed within the receiver of FIG. 2, may instead be performed outside of the receiver.

Figure 3:
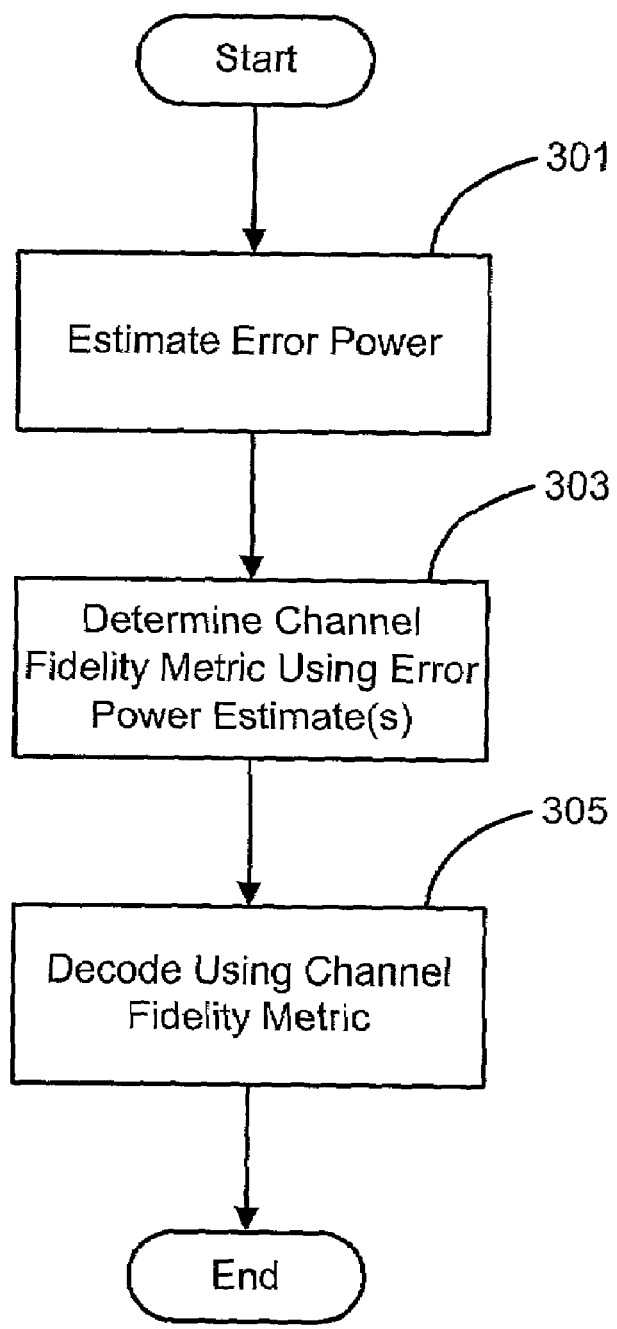
FIG. 3 is a flow diagram illustrating one embodiment of a method that may be performed using the system of FIG. 2, in accordance with the present invention.

FIG. 3 is a flow diagram illustrating one embodiment of a method that may be performed using the system of FIG. 2, in accordance with the present invention. In one operation of the method, the error power of an input to the system is estimated (block 301). A fidelity metric is determined, using the error power estimate (block 303). The fidelity metric determined is then used to decode the input (block 305). The method of FIG. 3 may be employed on a limited basis, such as only during the presence of the signal of interest, for example, or may be employed continuously. In other words, the method specifically identified in FIG. 3 may be employed in a continuous loop type fashion, for a limited or extended period of time. In either case, the error power of the input is estimated over time, and fidelity metrics are determined (each using one or more error power estimates of the input) and used to decode the input over time.

Figure 4:
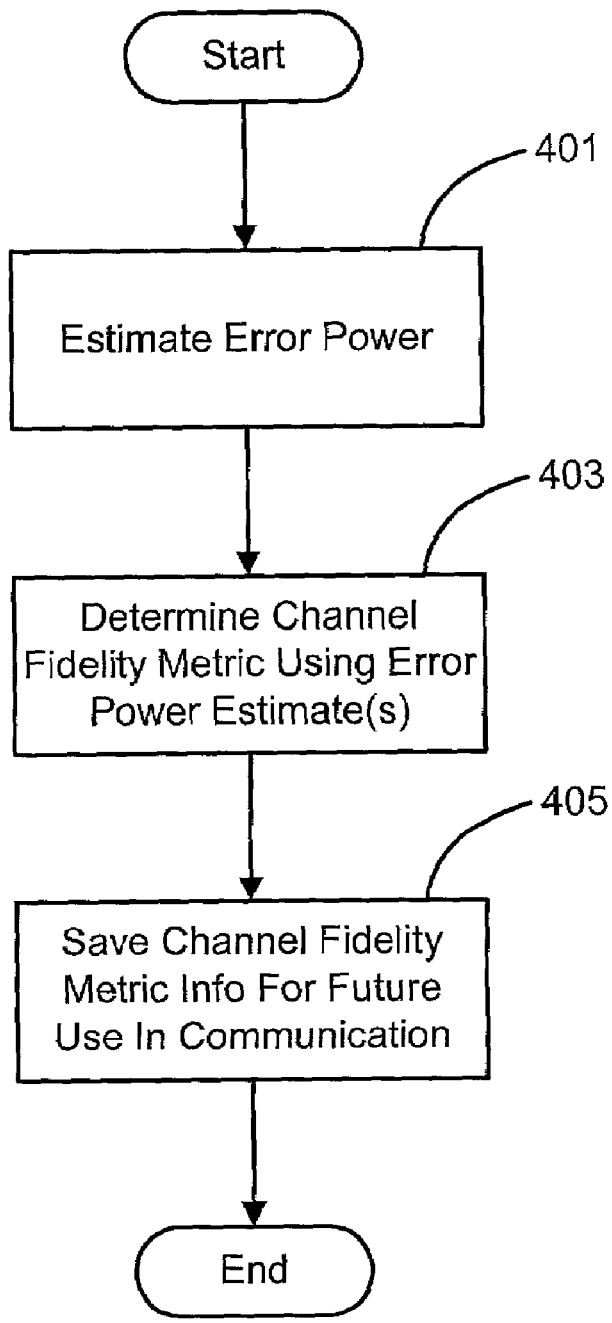
FIG. 4 is a flow diagram of another embodiment of a method that may be performed using the system of FIG. 2, in accordance with the present invention, where channel impairments are learned and catalogued in an efficient and pertinent manner, for future study and improvement of communications waveforms and processing using that channel.

FIG. 4 is a flow diagram of another embodiment of a method that may be performed using the system of FIG. 2, in accordance with the present invention. In one operation of the method, the error power of an input to the system is estimated (block 401). A fidelity metric is determined, using the error power estimate (block 403). The fidelity metric determined is then saved for future use in communications (block 405). Like the method of FIG. 3, the method of FIG. 4 may be employed on a limited basis, such as only during time periods when no signal of interest is present, for example, or may be employed continuously. In other words, the method specifically identified in FIG. 4 may, like that of FIG. 3, be employed in a continuous loop type fashion, for a limited or extended period of time. In either case, the error power of the input is estimated over time, fidelity metrics are determined (each using one or more error power estimates of the input) and information about the fidelity metrics is stored for future use in communications.

Specifically, for example, the stored information about the fidelity metrics may be used in transmit waveform optimization. In other words, the information may be used to determine a waveform that best suits the channel given what has been learned about the channel over time, as reflected in the stored fidelity metrics. The stored information about the fidelity metrics may also (or alternatively) be used in selecting receiver algorithms that are robust given the limitations of the channel, again as reflected in the stored fidelity metrics. Additional detail regarding use of catalogued channel fidelity metric information for future communications is discussed below.

In one embodiment of the present invention, the methods discussed above with respect to FIGS. 3 and 4 may be used in conjunction. For example, the method of FIG. 3 may be employed when a signal of interest is present, while the method of FIG. 4 may be used when no signal of interest is present.

The error power estimates discussed above with respect to FIGS. 2-4 may be generated in a multiplicity of ways, in the presence or absence of a signal of interest. In the absence of a signal of interest, the power of the receiver input may simply be the noise power. Filtering to the signal of interest bandwidth may be used if desirable.

In an embodiment where the system of FIG. 2 is a digital communications system, one particular approach for gathering the error power estimates during signaling is to calculate the distance (squared, for power) between the received signal and the nearest constellation point in the digital system's signaling alphabet. This error vector is typically available or readily obtainable from a slicer in a digital communications receiver.

The length of sliding window 205 of FIG. 2 is important in its selection and application, but in general, may be any length. A shorter window is a subset of a longer window, so longer and longer windows can theoretically provide better and better channel fidelity metrics. However, in practice, the window length should, for example, 1) be sized to accommodate a given (tolerable) amount of delay (acceptable to the rest of the receiver processing) in generating the channel fidelity metric, 2) not unnecessarily increase the complexity of the overall receiver, and 3) account for the durations or dynamics expected, or previously observed, in the dominating channel impairments. For example, if a transitory channel impairment has a duration of at most 10 symbols in a given digital communications system, then it is hard to justify the use of a window of 100 symbols. Similarly, a window of only 4 symbols, with the expectation of a persistence of 10 symbols of a given impairment condition, needlessly lessens the ability of the fidelity processor to make the best channel fidelity assessment, since it is denied relevant (correlated) information regarding the channel fidelity.

The processing of the sequence of error power estimates in the fidelity processor 207 of FIG. 2 may also take on many forms, depending on the complexity allowed, the size of the sliding window or duration or persistence of the impairment states, the delay allowed in generating the channel fidelity metrics, and on the use of the channel fidelity metric (i.e., the accuracy of the metric in matching the impairment level).

In its most simple form, the fidelity processor 207 may simply compare each error power estimate against a threshold, and output a binary channel fidelity estimate—i.e., "channel OK," and "channel degraded." While the window in this case consists of a single sample (or a single symbol in the digital communications example), the use of the catalogue of this information, and the beneficial use of this metric in subsequent receiver processing, may be employed in one embodiment of the present invention (such as shown in FIG. 2 and discussed with respect to FIGS. 3 and 4, for example).

Figure 5:
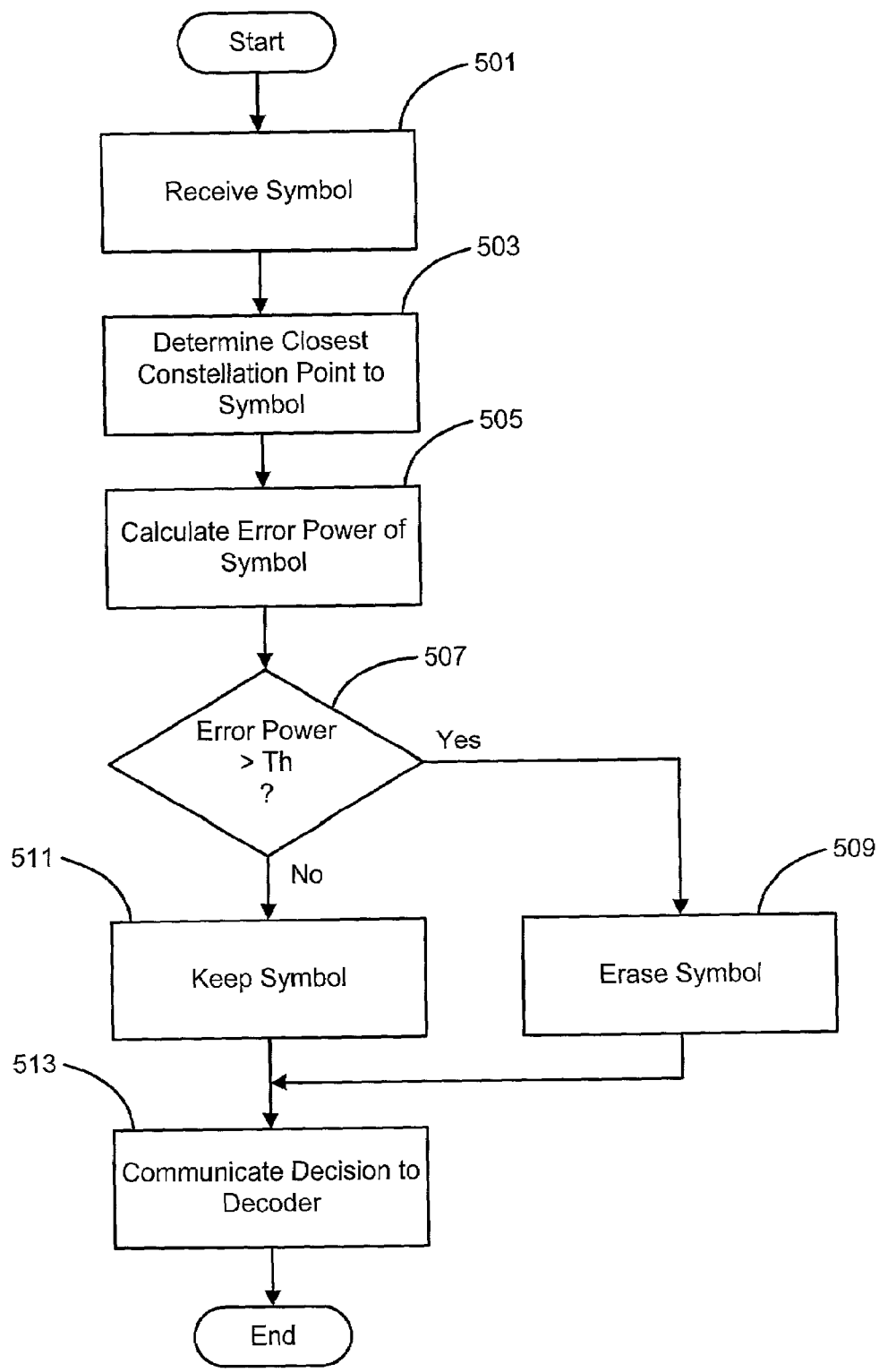
FIG. 5 is a flow diagram illustrating a method of impairment mitigation in accordance with one specific embodiment of the present invention.

FIG. 5 is a flow diagram illustrating a method of impairment mitigation in accordance with one specific embodiment of the present invention, for use in connection with digital communications. First, a symbol is received (block 501), and the closest constellation point to the symbol is determined (block 503). As mentioned above, the closest constellation point may be determined from a slicer in the receiver. Next, the error power of the symbol is calculated using, for example, the square of the distance between the received signal and the nearest constellation point in the digital system's signaling alphabet, also as mentioned above (block 505). The error power of the symbol is then compared to a threshold of error power (block 507). This is performed, for example, in the fidelity processor. If it is determined that the error power is greater than the threshold, then it is assumed that the channel is degraded, and the symbol is erased (block 509). If instead it is determined that the calculated error power of the symbol is not above the threshold, then it is assumed that the channel is OK, and the symbol is kept (block 511). In either case, the decision is communicated to the decoder (block 513). In other words, if the symbol is kept (block 511), the symbol is simply communicated to the decoder (block 513), whereas if the symbol is erased (block 509), an indication that the symbol has been erased is communicated to the decoder (block 513). This process is repeated for each symbol received.

While the method of FIG. 5 is shown to be performed on a symbol by symbol basis, it should be understood that multiple symbols may be considered. Moreover, the method may be employed using different means for calculating the error power (such as discussed herein), and different processing may be used to determine whether or not the channel is OK or whether a particular symbol(s) should be erased or kept (also such as discussed herein). In addition, the method may be employed in connection with analog communications, using samples rather than symbols.

As mentioned above with respect to FIG. 4, channel fidelity metric information obtained from the fidelity processor may be stored and used for future communications. In the particular example of FIG. 5, by analyzing the duty factor of the "channel OK" versus the "channel degraded" condition, and by analyzing the relative persistence of these conditions, the transmitting waveform can be adapted to these parameters. The appropriate amount of parity in FEC coding, and the best choice of interleaver parameters in FEC employing interleaving, are strongly related to these parameters.

Similarly, as mentioned above with respect to FIG. 3, the receiver can make use of this information directly. In the example of digital communications, the receiver marks the bits corresponding to the "channel degraded" condition as having very low confidence in subsequent FEC decoding. Reed-Solomon codes are known for accommodating both error correction and erasure marking in their decoding. By marking Reed-Solomon symbols that contain bits transmitted during "channel degraded" conditions as erasures, the decoder has a benefit of more information than a typical Reed-Solomon decoder working only with hard decisions. In other words, using the side information about the channel fidelity, the decoder can produce better results (i.e., higher rate of correct decoding). A Reed-Solomon decoder can accommodate twice as many erased symbols as it can correct erred symbols, so finding instances of degraded channel fidelity which often lead to erred Reed-Solomon symbols benefits the decoder, and marking these as erasures, greatly benefits the decoder. If nearly all of the Reed-Solomon symbol errors are attributable to the degraded channel, and if the degraded channel is fairly accurately detected (in the fidelity processor), then almost twice as many instances of the degraded condition can be tolerated.

Other fidelity processor examples include summing the error power estimates in the sliding window, and providing these or a scaled version (such as an average) as the channel fidelity estimate. Alternately, this sum or average can itself be quantized into a binary decision, or a finite number of levels (such as "channel pristine," "channel OK," and "channel degraded" in one example), or even compressed, via a square root operation, for example. If a dominant channel impairment is expected to persist for a duration of many symbols, then summing the error power estimates for at least several symbols increases the accuracy of the channel fidelity metric, especially during the "middle" of the impairment condition.

However, determining the precise moment when the degraded condition "turned on" and "turned off" may be difficult if a long window for summing is used, without other modification. One approach for this situation, where it is desired to increase the time-domain precision of the fidelity processor, is to compute the average error power during a window, and apply two thresholds, one on the average and one on individual samples of the error power estimates. The "channel degraded" assignment is only output at times corresponding to samples where the average error power in the window exceeded threshold #1, AND (a) the sample was between two samples which exceeded threshold #2, or (b) the sample was the only sample in the window which exceeded threshold #2.

Once again, a particular example would be to employ the summing of the nosie power estimates within the window, as just described, and compare this result with a threshold. This binary channel fidelity metric is then associated with the middle sample of the window (i.e., the delay corresponds to half the window duration). With Reed-Solomon FEC, as before, the "channel degraded" association with any bits in a Reed-Solomon symbol result in that symbol being marked for erasure in the decoding process. The method described above can again be applied to enhance the time-domain precision of the channel fidelity metric.

Figure 6:
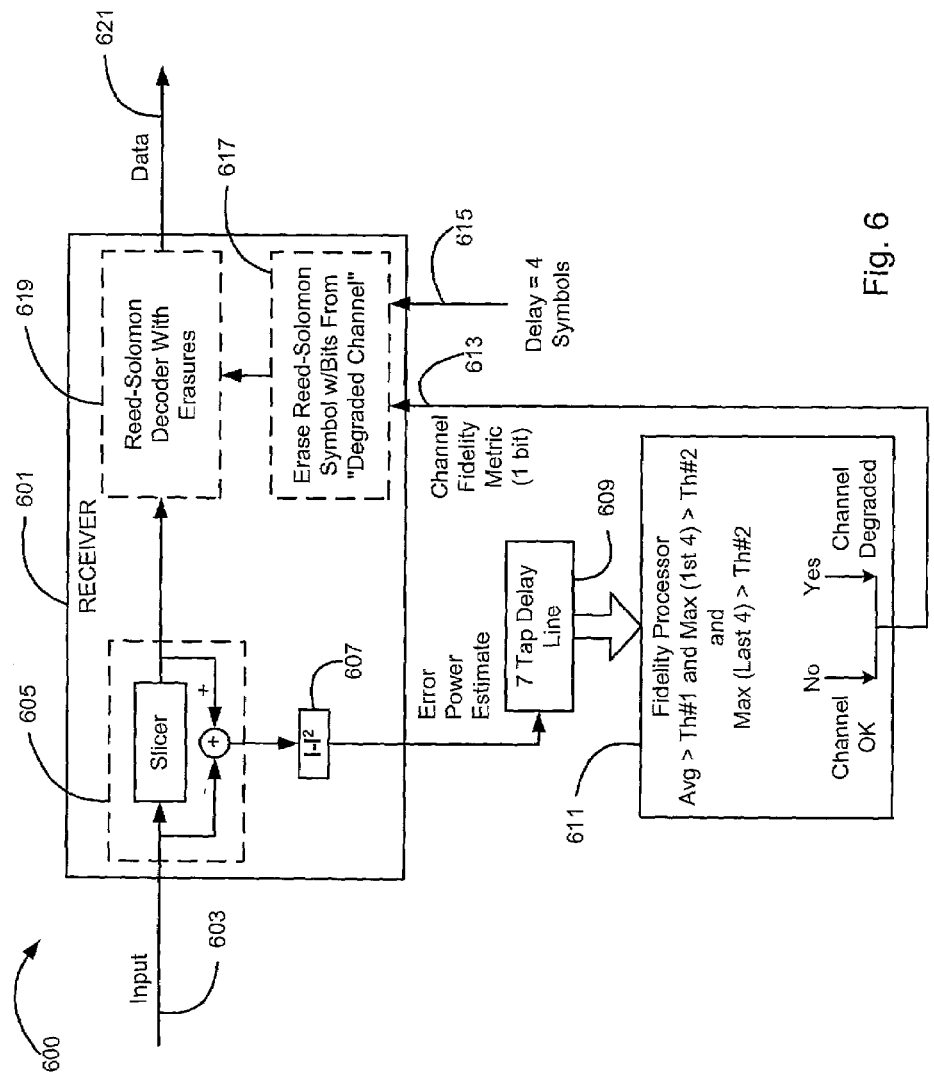
FIG. 6 is a block diagram of an impairment mitigation system in accordance with another embodiment of the present invention.

FIG. 6 is a block diagram of an impairment mitigation system 600 in accordance with this particular embodiment of the present invention. The system 600 (like system 200 of FIG. 2) may be contained, for example, in one or both of the communication nodes of FIG. 1. Referring to FIG. 6, a receiver 601 receives at input 603 an input of signal and/or noise, plus an occasional high-level noise burst, for example. The receiver, using slicer 605 and block 607, generates error power estimates, and may do so either on a bit by bit basis or using a sequence of bits (or on a symbol by symbol basis or using a sequence of symbols, in a digital communications example, or sample-by-sample in an analog waveform). A sliding window 609, shown as a 7 tap delay line, receives the error power estimates, which are then processed in a fidelity processor 611. The fidelity processor 611 continuously generates a metric for channel fidelity as the window (i.e., time) progresses.

Specifically, 7 tap delay line 609 captures 7 consecutive error power estimates at a time, and computes an average error power using the 7 captured estimates. In addition, the highest (maximum) error power of the first 4 captured estimates is determined (i.e., estimates 1 through 4), and the highest (maximum) error power of the last 4 captured estimates (i.e., estimates 4 through 7) is likewise determined. Next, a determination is made whether the average error power calculated is greater than a first threshold, and whether both maximum error powers are greater than a second threshold. If any one is not above its respective threshold, then a "channel OK" indication is sent to the receiver 601. If all three are above their respective thresholds, then a "channel degraded" indication is sent to the receiver 601. This indication may be a simple 1 bit channel fidelity metric (e.g., a "1" for channel OK and a "0" for channel degraded). In a digital communications example, the fidelity processor 611 generates a 1-bit channel fidelity metric over time for QAM constellations, for example.

The receiver 601 receives the channel fidelity metric (reference numeral 613) and is aware of the 4 sample or symbol delay (reference numeral 615). Processing block 617, knowing the channel fidelity metric and the particular sample or symbol being considered from the known delay, either erases the particular sample or symbol being considered (corresponding to a "channel degraded" fidelity metric), or keeps the particular sample or symbol being considered (corresponding to a "channel OK" fidelity metric). This process is repeated so that the error power estimate corresponding to each sample or symbol is considered by the fidelity processor 611. In the embodiment of FIG. 6, the particular sample or symbol being considered by the fidelity processor 611 is that corresponding to the error power estimate found at the $4^{th}$ position in the 7 tap delay line 609 (and hence the 4 sample or symbol delay).

A decoder 619, such as, for example, a Reed-Solomon Decoder, decodes the samples or symbols with erasures, as determined by the fidelity processor 611. Many different types of algorithms may be used in the fidelity processor to generate fidelity metrics. Decoded data, that is, an estimate of the transmitted signal, is then output at output 621 of the receiver 610. It should be understood that the functionality of processing block 617 may be part of the decoder 619. It should also be understood that means other than as shown in, or specifically discussed with respect to, FIG. 6 may be used to calculate error power and to generate the fidelity metric. Further, quantities other than 7 may be used for the tap delay line.

In addition, while FIG. 6 illustrates a system having some components and functionality located outside of the receiver, it should be understood that such system may have additional components or functionality located within the receiver, or may in fact be entirely contained within the receiver. In addition, it should also be understood that the estimation of the error power and the processing shown as being performed within the receiver of FIG. 6, may instead be performed outside of the receiver.

Figure 7A:
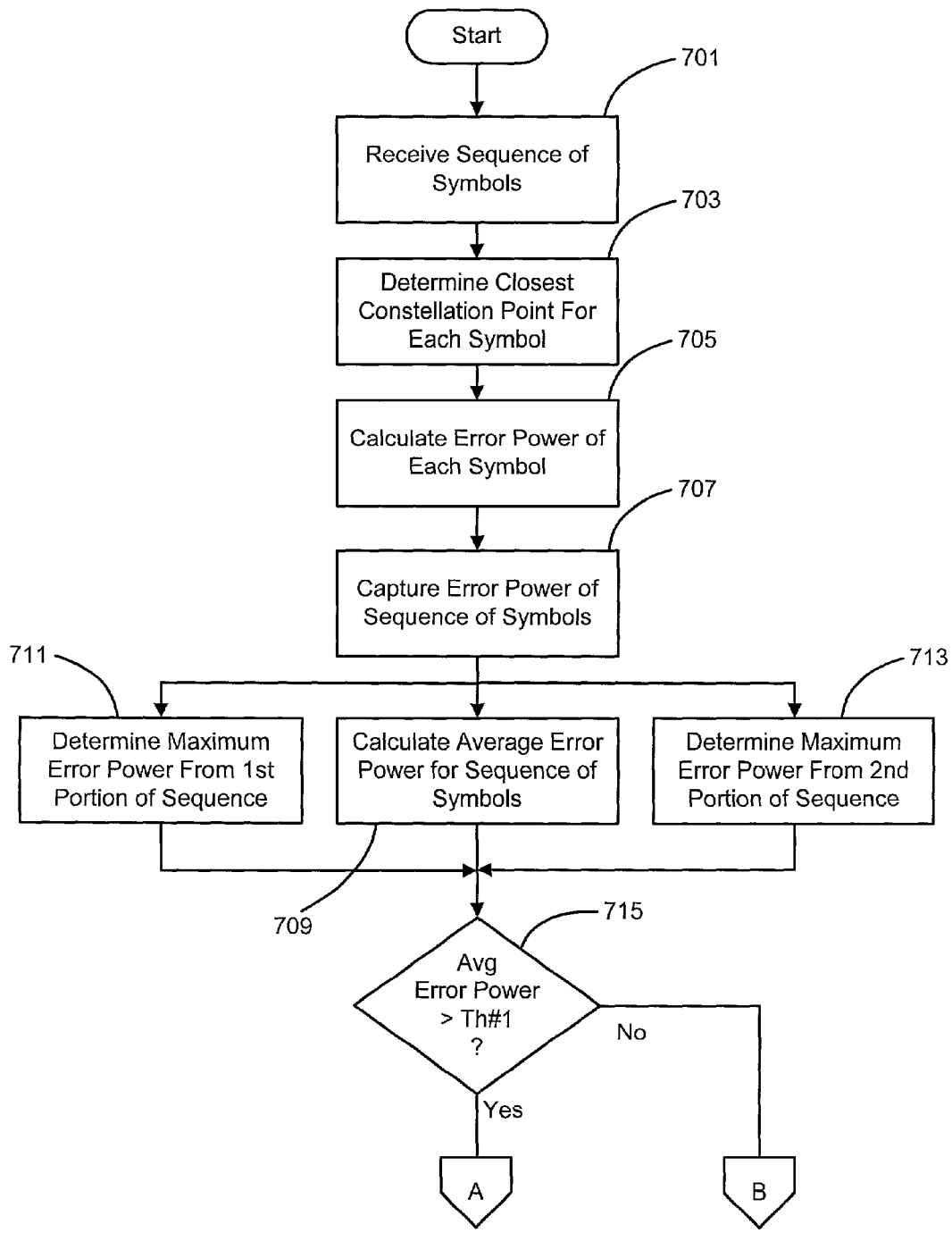
FIGS. 7A-7B are a flow diagram illustrating a method of impairment mitigation in accordance with one specific embodiment of the present invention, for use in connection with digital communications.
Figure 7B:
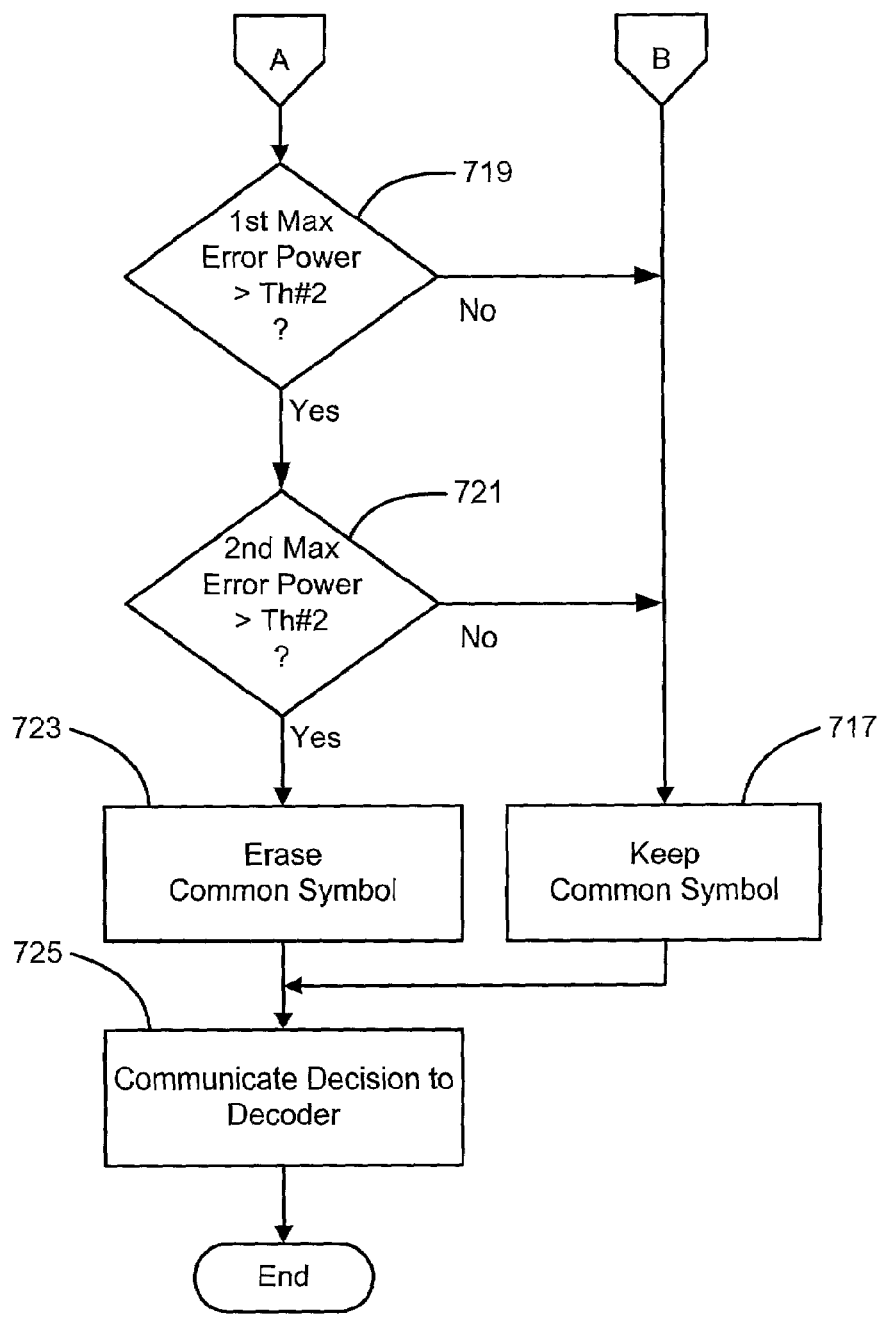

FIGS. 7A-7B are a flow diagram illustrating a method that may be employed using the system of FIG. 6, in a digital communications embodiment of the present invention. A sequence of symbols is received (block 701), and the closest constellation point to each symbol is determined (block 703). The error power of each symbol is calculated, for example, using the square of the distance between the received symbol and the nearest constellation point in the digital system's signaling alphabet, as mentioned above (block 705). Of course, other methods of calculating or estimating the error power of each symbol may be used.

Next, the error power of a sequence of symbols is captured (block 707), and an average power of the captured sequence is calculated (block 709). In addition, a maximum error power from a first portion of the captured sequence is determined (block 711), and a maximum error power from a second portion of the sequence is likewise determined (block 713). The first and second portions of the sequence each include a common symbol that is the "middle" symbol of the whole sequence (i.e., the last symbol of the first portion and the first symbol of the second portion). In other words, for a sequence of length n, an odd number, the middle symbol may be defined by 1+(n−1)/2. It is this number that defines the symbol that is being considered as well as the symbol delay for decoding purposes. Again, as mentioned above with respect to FIG. 6, the sequence length may be 7, which makes symbol 4 of the sequence the symbol that is being considered, and defines the decoder delay to be 4 symbols. Of course, even numbers may be used for window length, too, and the symbol (or sample) under consideration need not be the one in the center of the window. The use of an odd window length and center symbol (sample) for which the channel fidelity is being estimated is purely an example.

The average error power of the sequence is then compared to a first threshold (block 715). If the average is not above the first threshold, the common symbol is kept (block 717), otherwise, the maximum error power of the first portion of the sequence is compared to a second threshold (block 719). If that first maximum is not above the second threshold (block 719), the common symbol is kept (block 717), otherwise, the maximum error power of the second portion of the sequence is compared to the second threshold (block 721). If that second maximum is not above the first threshold, the common symbol is kept, otherwise, the common symbol is erased. In any case, the decision of whether to erase or keep the common symbol is communicated to the decoder (block 725). The process is then repeated, so that each symbol received is at some point considered (i.e., each symbol received is the common symbol for one iteration of the process).

For a 16 QAM constellation example having a constellation RMS power of 3.162 (i.e., the square root of 10) and, for example, a 7 symbol sequence, the first threshold may be 0, and the second threshold may be 0.64, for example. Of course, the second threshold may be set to 0, such that just the average error power of the whole sequence is used.

Figure 8A:
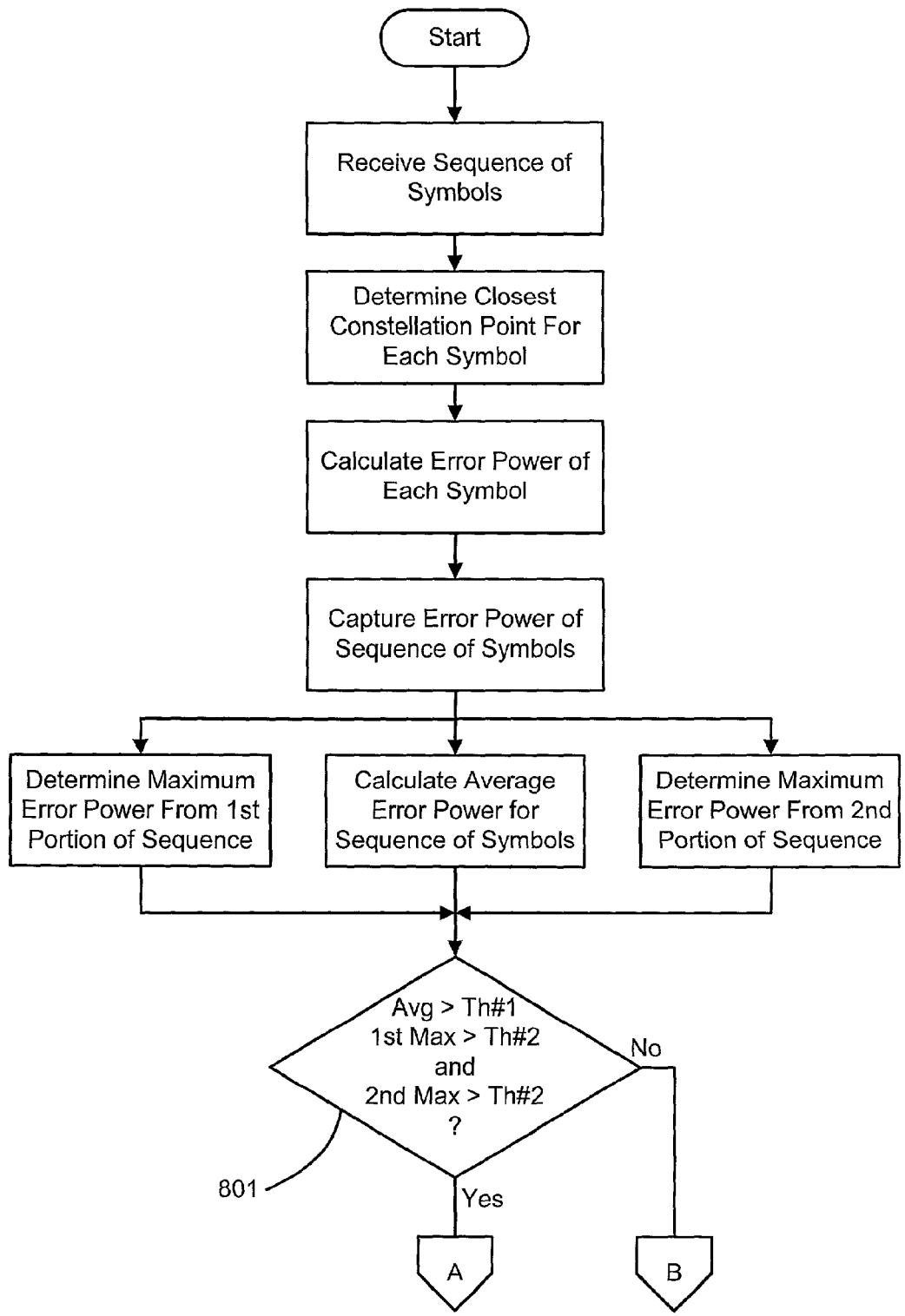
FIGS. 8A-8B are a flow diagram illustrating a method of impairment mitigation in accordance with another specific embodiment of the present invention, for use in connection with digital communications.
Figure 8B:
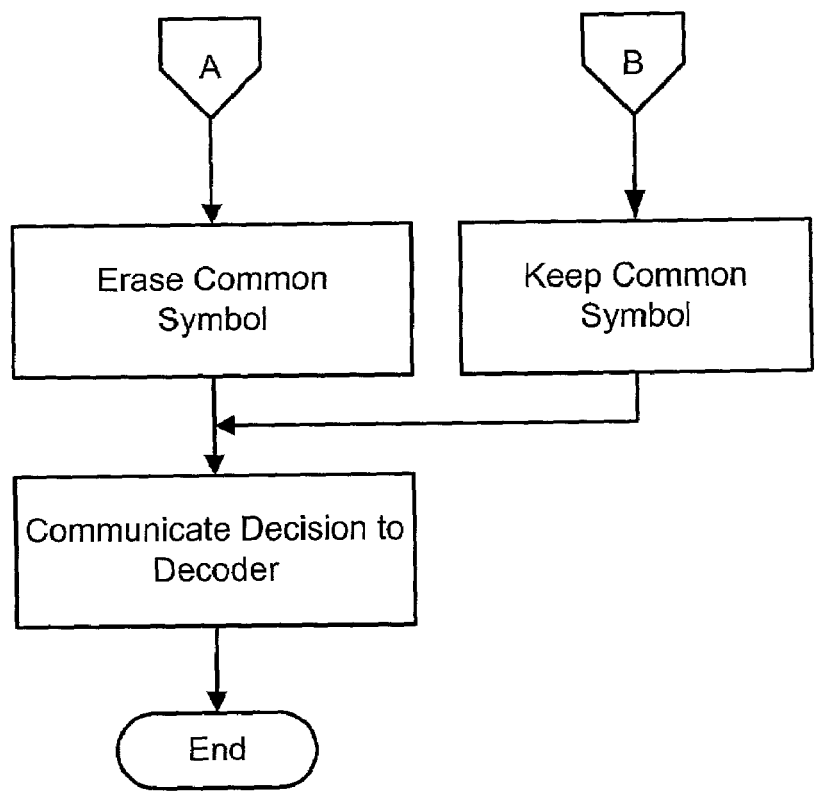

While the decisions made by blocks 715, 719 and 721 of FIGS. 7A-7B are shown to be in a particular sequence, any order of those decisions may be employed. In addition, those decisions may instead be performed simultaneously, rather than sequentially, as shown in FIGS. 8A-8B. Specifically, decision block 801 of FIG. 8A replaces the decision blocks 715, 719 and 721 of FIGS. 7A-7B. A single determination is made at block 801 of FIG. 8A, based on the three comparisons, whether the common symbol should be erased or kept.

Another particular example for applying the channel fidelity metric to enhance the receiver processing follows with the summing of the error power over a sliding window. Especially with high density constellations, and with an impairment of low power or one such as gain compression, where the impairment likely does not cause the received, distorted signal to fall outside the normal signaling constellation, the fidelity processor can determine the presence of the impairment, but a significant fraction of the error power estimates may be rather small (since the received signal falls close to one of the many wrong symbols). In these cases, even with convolutional coding FEC and traditional Viterbi decoding, the branch metrics in the decoding process are not most accurately reflecting the state of the channel fidelity when they are simply the error power estimates or log of error power estimates (for each symbol) from the slicer. Knowing that a degraded channel condition existed even when a signal was received "close" to a constellation point can be very beneficially used in the decoding, especially when "channel interleaving" is performed prior to the decoding, thus dispersing the impacted symbols.

Figure 9:
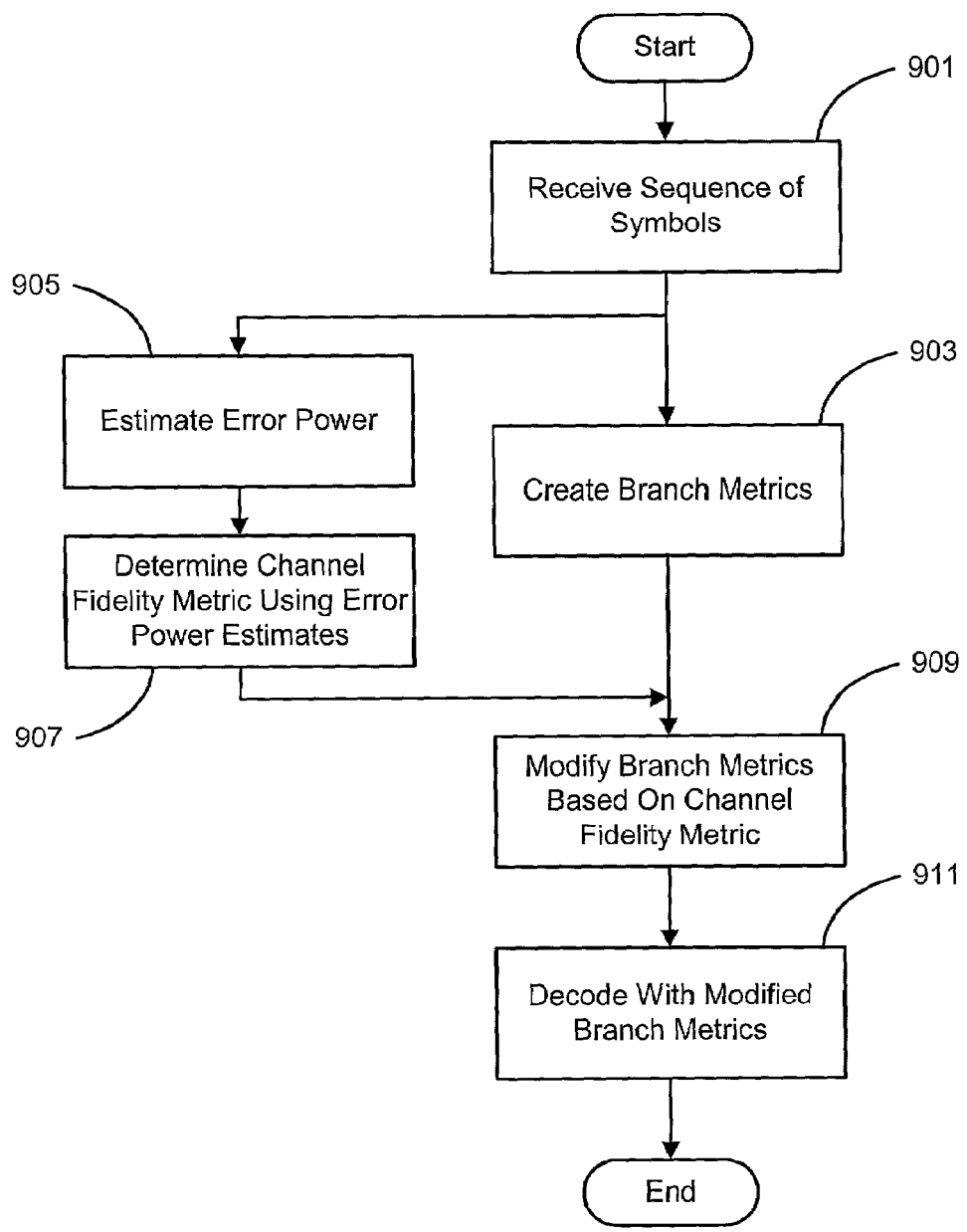
FIG. 9 is a flow diagram illustrating a method that uses a fidelity metric to modify branch metrics in the decoding process, in accordance with one embodiment of the present invention.

FIG. 9 is a flow diagram illustrating a method that uses a fidelity metric to modify branch metrics in the decoding process, in accordance with one embodiment of the present invention. First, a sequence of symbols is received (block 901), error power estimates are estimated or determined (block 903), and channel fidelity metrics are determined using the error power estimates (block 905). This may be achieved using any means discussed herein, for example. In addition, branch metrics are created (block 907). For example, in a Viterbi decoder example, branch metrics are created for the Viterbi decoder branches. (Scaled logarithms of the error power are typically used). The Viterbi branches are normally inversely related to the error power from various constellation symbols, since the branch metrics represent the likelihood of the branch transition.

Once branch metrics are created (block 907), the branch metrics are modified based on the channel fidelity estimate (block 909). For example, the branch metric may be set to a low probability value if the channel fidelity is determined to be poor. Finally, decoding (e.g., Viterbi) is performed using the modified branch metric (block 911). This overall process may then be repeated.

As mentioned above, various embodiments of the present invention provide for a fidelity processor that examines a sliding window of error power estimates to yield a channel fidelity metric. While specific fidelity processing examples have been discussed above, still other types of fidelity processing may be employed in connection with the various embodiments of the present invention. For example, median filters or other ranking devices may be used. In a median filter, the middle ranked value within a window is output. Once again, as above, this value could be output "as is," or quantized with various thresholds, perhaps into a single binary output.

Other forms of nonlinear filtering may also serve as useful fidelity processors. For example, the error power estimates may be quantized to a binary level with a threshold, i.e., "1" for greater than threshold and "0" for less than threshold, and these quantized samples filtered or averaged. This would simplify the "averaging" complexity, and a second threshold as described above could be applied to enhance the precision of marking the "turn on" and "turn off" of the severe impairments.

Still other types of fidelity processing may include, for example, (1) summing, (2) ranking, (3) thresholding and summing, (4) summing and twice thresholding (sum and individual points in the window), (5) quantizing the error power estimates or otherwise nonlinearly processing them (e.g., square root or log), (6) averaging across the window and taking the maximum of the average and (some factor multiplying) the middle error power estimate in the window, (7) taking the maximum of the median ranked value in the window and (some factor multiplying) the middle error power estimate in the window, (8) nonlinearly processing the error power estimates and averaging, and (9) quantizing the results from the aforementioned operations and/or nonlinearly processing them.

Further, the channel fidelity metric may be used to analyze channel behavior, such as duration and fraction of time of impaired conditions compared to unimpaired, especially for determining most suitable FEC and symbol rates and constellation sizes, etc., for the dynamically varying channel. In addition, the channel fidelity metric may be applied to the receiver for beneficial use of processing signals received contemporaneous with the channel fidelity estimate. Some examples of using the channel fidelity metric to enhance receiver performance include:

(1) marking Reed-Solomon symbols for erasure in a Reed-Solomon decoder capable of erasure and error correction decoding, and (2) in convolutional coded FEC (or other soft-decision decoders, such as Turbo decoding), affecting the soft-decision metric for a symbol with this additional channel fidelity metric.

This latter case especially benefits from this technique if channel interleaving is performed on the symbol soft-decisions prior to the decoding. Various embodiments of the present invention are especially effective at enhancing receiver performance with severe impairment duration of multiple symbols, and with high density signaling constellations, as seen in these particular examples.

While the error power estimates discussed above have been generated outside of the decoding process, decoding may be used to generate a potentially improved error power estimate. In other words, another method for generating the error power estimate is to actually perform a preliminary decoding (if FEC is employed), or partial decoding, and perform a better estimate of the transmitted waveform to more accurately estimate the error power. Such an approach means that there would be delay in the generation of the error power estimates, but often this is not a constraint. A second-pass at the decoding, now with the benefit of the channel fidelity metric (versus time) arising from the first-pass error power estimates, provides enhanced performance in the time-varying impairment scenario.

Figure 10:
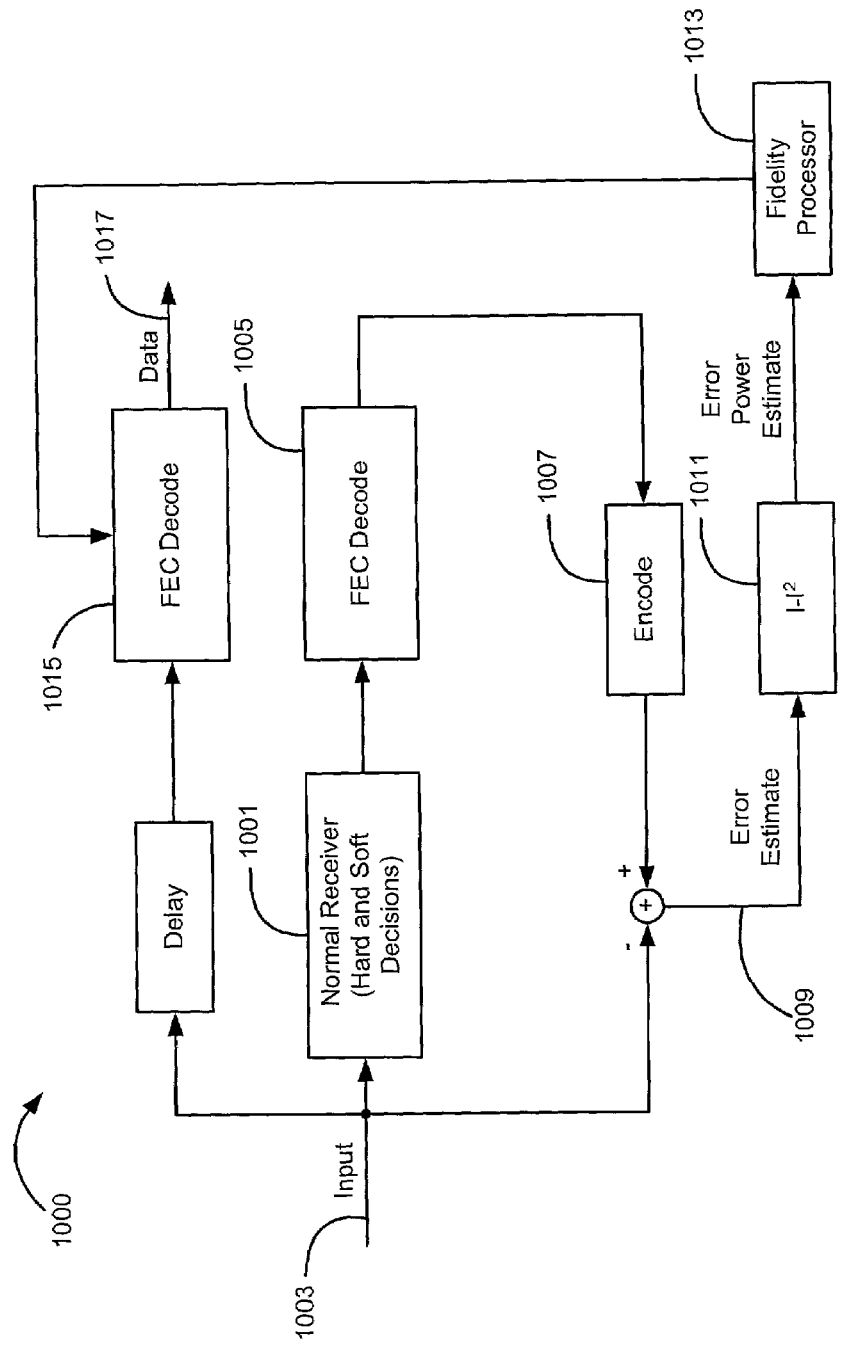
FIG. 10 is a block diagram of an impairment mitigation system that uses preliminary decoding in generating error power estimates, in accordance with one embodiment of the present invention.

FIG. 10 is a block diagram of an impairment mitigation system 1000 that uses preliminary decoding in generating error power estimates, in accordance with one embodiment of the present invention. The system 1000 may be contained, for example, in one or both of the communication nodes of FIG. 1. A receiver 1001 receives an input 1003, and performs normal hard and soft decisions. The information is then FEC decoded in FEC decoder 1005, and the information is then re-encoded by encoder 1007. The re-encoded information is then used along with the original input at 1003, to generate an error estimate (reference numeral 1009), which in turn is used to calculate an error power estimate (reference numeral 1011). A fidelity processor 1013 uses the error power estimate to generate a channel fidelity metric, such as discussed above. FEC decoder 1015 uses the channel fidelity metric, along with the original, delayed input to decode the input, and output decoded data, i.e., an estimate of the transmitted signal, at output 1017. Of course, it should be understood that FEC decoder 1005 and FEC decoder 1015 may be combined into a single decoder.

Figure 11:
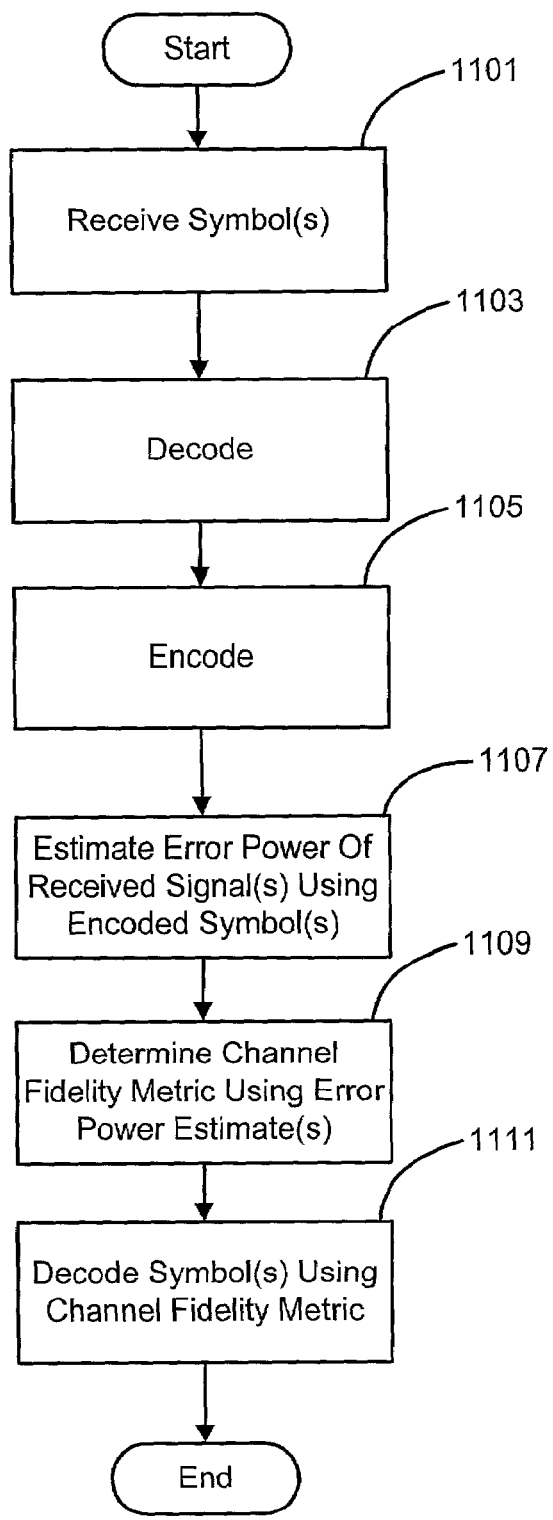
FIG. 11 is a flow diagram illustrating one embodiment a method of impairment mitigation that may be employed using the system of FIG. 10.

FIG. 11 is a flow diagram illustrating one embodiment of a method of impairment mitigation that may be employed using the system of FIG. 10, for example. One or more symbols are received (block 1101), are decoded (block 1103) and then encoded (block 1105). The error power of the received signal(s) is then estimated using the encoded symbol(s) (block 1107). A channel fidelity metric is then determined using the error power estimate(s) (block 1109), and the symbol(s) are decoded using the channel fidelity metric determined (block 1111). If at block 1103 it is determined that particular received symbol(s) cannot be decoded and thus re-encoded, then those particular symbols are simply erased for estimation of error, for example.

As can be seen, the system of FIG. 10 and method of FIG. 11 determine a fidelity metric after an initial decoding, and use it to perform a subsequent decoding. Multiple iterations of this process may be beneficial in some cases.

Based on the above, various embodiments of the present invention provide means to characterize the transitory nature of the impairments; i.e., to develop knowledge, characterizing not just typical or even average levels of an impairment, but an understanding and characterization of the dynamic behavior of the impairment. With this knowledge, it is possible to facilitate improved communications in the channel, either by adjusting the transmission signal design, or by altering or adjusting the receiver processing, or both.

If the dynamic nature of the impairments is so rapid that it transitions from benign to severe and back to benign again, faster than the receiver can determine and communicate back to the original transmitter this degradation in the channel, then any adjustments in the transmission waveform are "permanent," in the sense that adaptation to the temporarily degraded channel is precluded by the dynamics. Still, the optimal transmission waveform may be different if and when it is learned that the channel contains some severe but transitory impairment(s). Thus, it benefits the communications system to learn and characterize the transitory nature of the impairments, by leading to a superior transmit waveform with this new knowledge.

While some situations may preclude the feedback and adjustment of the transmit waveform for adapting to a temporary increase of an impairment, in such situations, the receiver may still benefit from this knowledge.

Many modifications and variations of the present invention are possible in light of the above teachings. Thus, it is to be understood that, within the scope of the appended claims, the invention may be practiced otherwise than as described hereinabove.

The invention claimed is:

1. A method of impairment mitigation in a communication system comprising:
   generating at least one error estimate of a signal;
   determining a channel fidelity metric using the at least one error estimate;
   generating a branch metric for a decoder;
   modifying the branch metric based on the channel fidelity metric; and
   decoding the signal using the modified branch metric.

2. The method of claim 1 wherein the decoder is a Viterbi decoder.

3. The method of claim 1 wherein modifying the branch metric comprises setting the branch metric to a low probability if the fidelity metric indicates a degraded channel.

4. The method of claim 1 wherein the decoder is a Reed-Solomon decoder.

5. The method of claim 1 wherein the decoder is a Turbo decoder.

6. The method of claim 1 wherein the decoder is a Forward Error Correction (FEC) decoder.

7. The method of claim 1 wherein the signal comprises one of at least one digital sample and at least one symbol, further comprising:
   storing the channel fidelity metric; and
   determining a transmit waveform using the stored fidelity metric.

8. The method of claim 1 wherein the signal comprises one of at least one digital sample and at least one symbol, further comprising:
   storing the channel fidelity metric; and
   selecting a receiver algorithm using the stored fidelity metric.

9. The method of claim, 1 wherein the signal comprises at least one symbol, and wherein generating at least one error estimate comprises:
   determining at least one constellation point closest to the at least one symbol;
   determining a distance between the at least one symbol and the at least one constellation point; and
   squaring the distance.

10. The method of claim 1, wherein the signal comprises at least one symbol, and wherein determining a channel fidelity metric comprises:
    comparing the at least one error estimate to at least one predetermined threshold.

11. The method of claim 10 further comprising generating a first indication if the at least one error estimate is above the at least one predetermined threshold and a second indication if the at least one error estimate is not above the at least one predetermined threshold.

12. The method of claim 10 comprising keeping a select symbol if the at least one error estimate is below the at least one predetermined threshold, and erasing the select symbol if the at least one error estimate is above the at least one threshold.

13. A method of impairment mitigation in a communications system comprising:
    generating at least one error estimate of a signal, wherein the signal comprises a sequence of symbols, and wherein a first portion of the sequence comprises at least one select symbol;
    determining a channel fidelity metric using the at least one error estimate;
    decoding the signal using the channel fidelity metric;
    determining a first error estimate from the sequence of symbols;
    determining a second error estimate from a second portion of the sequence of symbols including the at least one select symbol;
    determining a third error estimate from a third portion of the sequence of symbols including the at least one select symbol;
    comparing the first error estimate to a first predetermined threshold, and the second and third error estimates to a second predetermined threshold; and
    erasing at least a portion of the at least one select symbol if the first is above the first predetermined threshold and if the second and third error estimate are above the second predetermined threshold.

14. The method of claim 13 wherein the decoder is a Reed-Solomon decoder.

15. The method of claim 13 wherein the decoder is a Turbo decoder.

16. The method of claim 13 wherein the decoder is a Forward Error Correction (FEC) decoder.

17. A method of impairment mitigation in a communications system comprising:
    generating at least one error estimate of a signal received from a channel, wherein the signal comprises a sequence of symbols, and wherein a first portion of the sequence comprises at least one select symbol;
    determining if the channel is degraded based on the at least one error estimate;
    erasing a select symbol of the signal if the channel is degraded;
    decoding the signal;
    determining a first error estimate from the sequence of symbols;
    determining a second error estimate from a second portion of the sequence of symbols including the at least one select symbol;
    determining a third error estimate from a third portion of the sequence of symbols including the at least one select symbol;
    comparing the first error estimate to a first predetermined threshold, and the second and third error estimates to a second predetermined threshold;
    generating an indication that the channel is degraded if the first error e above the first predetermined threshold and if the second and third error estimates are above the second predetermined threshold.

18. The method of claim 17 wherein the decoder is a Reed-Solomon decoder.

19. The method of claim 17 wherein the decoder is a Turbo decoder.

20. The method of claim 17 wherein the decoder is a Forward Error Correction (FEC) decoder.

21. A method of impairment mitigation in a communications system comprising:
- generating at least one error estimate of a signal;
- determining a channel fidelity metric using the at least one error estimate;
- decoding the signal using the channel fidelity metric;
- storing the channel fidelity metric;
- determining a transmit waveform using the stored fidelity metric; and
- wherein the signal comprises one of at least one digital sample or at least one symbol.

22. The method of claim 21 wherein the decoder is a Reed-Solomon decoder.

23. The method of claim 21 wherein the decoder is a Turbo decoder.

24. The method of claim 21 wherein the decoder is a Forward Error Correction (FEC) decoder.

25. A method of impairment mitigation in a communications system comprising:
- generating at least one error estimate of a signal;
- determining a channel fidelity metric using the at least one error estimate;
- decoding the signal using the channel fidelity metric;
- storing the channel fidelity metric;
- selecting a receiver algorithm using the stored fidelity metric; and
- wherein the signal comprises one of at least one digital sample or at least one symbol.

26. The method of claim 25 wherein the decoder is a Reed-Solomon decoder.

27. The method of claim 25 wherein the decoder is a Turbo decoder.

28. The method of claim 25 wherein the decoder is a Forward Error Correction (FEC) decoder.

* * * * *